(12) United States Patent
Looney et al.

(10) Patent No.: US 10,782,263 B2
(45) Date of Patent: Sep. 22, 2020

(54) SYSTEMS AND METHODS FOR DETERMINING THE CONDITION OF A GAS SENSOR

(71) Applicant: Analog Devices Global, Hamilton (BM)

(72) Inventors: Michael Looney, Croagh (IE); GuangYang Qu, Beijing (CN)

(73) Assignee: Analog Devices Global, Hamilton (BM)

( * ) Notice: Subject to any disclaimer, the term of this patent is extended or adjusted under 35 U.S.C. 154(b) by 431 days.

(21) Appl. No.: 15/586,849

(22) Filed: May 4, 2017

(65) Prior Publication Data

US 2018/0321186 A1 Nov. 8, 2018

(51) Int. Cl.
*G01N 27/416* (2006.01)
*G01N 27/12* (2006.01)
*G01N 27/404* (2006.01)

(52) U.S. Cl.
CPC ....... *G01N 27/4163* (2013.01); *G01N 27/122* (2013.01); *G01N 27/404* (2013.01)

(58) Field of Classification Search
CPC ............ F02D 41/1483; F02D 41/1461; F02D 41/1474; F02D 41/146; F02D 41/1455; F02D 41/1494; F02D 41/1444; F02D 41/30; G01N 27/122; G01N 27/4163; G01N 27/404–407; G01N 27/4074;

(Continued)

(56) References Cited

U.S. PATENT DOCUMENTS

| 4,178,793 A | 12/1979 | Bremer et al. |
| 4,638,260 A | 1/1987 | Hamley |

(Continued)

FOREIGN PATENT DOCUMENTS

| CN | 1677640 A | 10/2005 |
| CN | 1841059 | 10/2006 |

(Continued)

OTHER PUBLICATIONS

"Analog Devices ADuDM350 Hardware Reference Manual UG-587", Rev. C, © 2014-2016, (2014-2016), 459 pgs.

(Continued)

*Primary Examiner* — Gurpreet Kaur
(74) *Attorney, Agent, or Firm* — Schwegman Lundberg & Woessner, P.A.

(57) ABSTRACT

An impedance in an electrochemical gas sensor can be measured by connecting at least one pin in an integrated circuit to at least one electrode in an electrochemical gas sensor, using a damping capacitor to connect the at least one pin in the integrated circuit to an electrical ground, applying a voltage to the electrochemical gas sensor to provide a bias voltage to at least one electrode in the electrochemical gas sensor, receiving a current from at least one electrode in the electrochemical gas sensor, determining a measured gas amount from the received current, activating a switch located within the integrated circuit to isolate the damping capacitor from the at least one pin in the integrated circuit, and measuring an impedance of the electrochemical gas sensor using an excitation signal while the at least one damping capacitor is isolated from the at least one electrode in the electrochemical gas sensor.

20 Claims, 3 Drawing Sheets

(58) Field of Classification Search
CPC .... G01N 27/409; G01N 27/419; G01N 27/41; G01N 33/007
See application file for complete search history.

(56) References Cited

U.S. PATENT DOCUMENTS

| | | | |
|---|---|---|---|
| 4,916,641 A | 4/1990 | Bybee | |
| 4,968,946 A | 11/1990 | Maier | |
| 5,004,986 A | 4/1991 | Bohrer | |
| 5,216,226 A | 6/1993 | Miyoshi | |
| 5,262,779 A | 11/1993 | Sauer | |
| 5,440,219 A | 8/1995 | Wilkerson | |
| 5,495,245 A | 2/1996 | Ashe | |
| 5,585,796 A | 12/1996 | Svensson | |
| 5,689,183 A | 11/1997 | Kohama | |
| 5,969,657 A | 10/1999 | Dempsey et al. | |
| 6,163,289 A | 12/2000 | Ginetti | |
| 6,414,616 B1 | 7/2002 | Dempsey | |
| 6,452,405 B1 | 9/2002 | Collier-Hallman | |
| 6,778,122 B2 | 8/2004 | Lien | |
| 7,109,904 B2 | 9/2006 | Fotouhi | |
| 7,136,002 B2 | 11/2006 | Dempsey et al. | |
| 7,339,508 B2 | 3/2008 | Cosgrave et al. | |
| 7,501,970 B2 | 3/2009 | Trifonov et al. | |
| 8,456,347 B2 | 6/2013 | Wikner | |
| 9,065,479 B2 | 6/2015 | Dempsey | |
| 9,100,045 B2 | 8/2015 | Dempsey | |
| 9,124,296 B2 | 9/2015 | Dempsey | |
| 9,407,278 B1 | 8/2016 | Dempsey | |
| 9,444,487 B1 | 9/2016 | Dempsey | |
| 10,288,674 B2 | 5/2019 | Qu et al. | |
| 2005/0110103 A1 | 5/2005 | Setlak | |
| 2006/0102476 A1* | 5/2006 | Niwa | G01N 27/4067 204/425 |
| 2006/0263254 A1 | 11/2006 | Lee | |
| 2009/0218220 A1* | 9/2009 | Matter | G01N 27/4074 204/424 |
| 2012/0065540 A1 | 3/2012 | Yarden et al. | |
| 2012/0078071 A1 | 3/2012 | Bohm et al. | |
| 2013/0085439 A1 | 4/2013 | Sansoucy et al. | |
| 2013/0102061 A1 | 4/2013 | Coursey et al. | |
| 2017/0067844 A1 | 3/2017 | Vellaisamy | |
| 2018/0321302 A1 | 11/2018 | Qu et al. | |

FOREIGN PATENT DOCUMENTS

| | | |
|---|---|---|
| CN | 1853108 A | 10/2006 |
| CN | 1906481 | 1/2007 |
| CN | 101622528 | 1/2010 |
| CN | 102445485 | 5/2012 |
| EP | 1262755 A1 | 12/2002 |
| JP | 3424611 | 8/1999 |
| JP | 2018189651 | 11/2018 |

OTHER PUBLICATIONS

"Analog Devices 16-Bit Precision, Low Power Metter on a Chip with Cortex-M3 and Connectivity", © 2014 Analog Devices, Inc., Data Sheet ADuCM350 Rev. A, (2014), 41 pgs.

"Designing a PotentioStatic Cicuit", Alphasense Application Note—AAN 105-03, (Mar. 2009), 5 pgs.

Bryant, James, et al., "Chapter 3 Data Converter Architectures", *The Data Conversion Handbook*, (2005), 3.1-3.9.

"U.S. Appl. No. 15/586,869, Notice of Allowability dated Feb. 21, 2-10", 2 pgs.

"U.S. Appl. No. 15/586,869, Notice of Allowance dated Jan. 4, 2019", 11 pgs.

"U.S. Appl. No. 15/586,869, Notice of Non-Compliant Amendment dated Mar. 5, 2019", 3 pgs.

"U.S. Appl. No. 15/586,869, PTO Response to Rule 312 Communication dated Apr. 10, 2019", 2 pgs.

"U.S. Appl. No. 15/586,869, Response filed Apr. 4, 2019 to Notice of Non Compliant dated Mar. 5, 2019", 45 pgs.

"Chinese Application Serial No. 201810419135.X, Office Action dated Jan. 16, 2020", w/ English Translation, 10 pgs.

"Chinese Application Ser. No. 201810453093.1, Office Action dated Mar. 20, 2020", w/ English Translation, 30 pgs.

* cited by examiner

SYSTEMS AND METHODS FOR DETERMINING THE CONDITION OF A GAS SENSOR

CROSS-REFERENCE TO RELATED PATENT DOCUMENTS

This patent application is also related to: (1) a U.S. Patent Application, filed even date herewith, entitled MULTIPLE STRING, MULTIPLE OUTPUT DIGITAL TO ANALOG CONVERTER (Ser. No. 15/586,848), naming Shurong Gu, Dennis A. Dempsey, GuangYang Qu, Hanging Wang, and Tony Yincai Liu as inventors, the disclosure of which is hereby incorporated herein by reference, in its entirety, including its disclosure of a dual-output DAC; (2) a U.S. Patent Application, filed on even date herewith, entitled INTERNAL INTEGRATED CIRCUIT RESISTANCE CALIBRATION (Ser. No. 15/586,877), naming GuangYang Qu, Leicheng Chen, and Michael Looney as inventors, the disclosure of which is hereby incorporated herein by reference, in its entirety, including its disclosure of resistance measurement or calibration; and (3) a U.S. Patent Application, filed on even date herewith, entitled IMPEDANCE CHARACTERISTIC CIRCUIT FOR ELECTROCHEMICAL SENSOR (Ser. No. 15/586,869), naming GuangYang Qu, Junbiao Ding, Tony Yincai Liu, Shurong Gu, Yimiao Zhao, Hanging Wang, and Leicheng, Chen as inventors, the disclosure of which is hereby incorporated herein by reference, in its entirety, including its disclosure of impedance characteristic circuits for electrochemical sensors.

FIELD OF THE DISCLOSURE

The present disclosure relates to systems and methods for determining the impedance of an electrochemical gas sensor.

BACKGROUND

Certain electrochemical gas sensors can sense a gas concentration using at least one pair of electrodes. In a three electrode gas sensor, current flowing to or from the working electrode can provide an indication of a gas concentration in contact with the electrochemical gas sensor.

SUMMARY OF THE DISCLOSURE

In an electrochemical gas sensor having electrodes, a filter element (e.g., a capacitor) can be used to reduce an amount of electromagnetic interference reaching the electrodes, such as to provide improved performance of the electrochemical gas sensor. However, the present inventors have recognized, among other things, that the filter element may inhibit diagnostic testing of the sensor, where the diagnostic testing can be used to determine a status of the sensor's electrolyte, where the properties of the electrolyte can change, such as due to aging. The inventors have recognized, among other things, that it may be advantageous to temporarily isolate the filter element, such as to facilitate diagnostic testing (e.g., an impedance measurement) of the sensor.

In an aspect, the disclosure can feature a method of measuring an impedance of an electrochemical gas sensor. The method can include connecting at least one pin in an integrated circuit to at least one electrode in an electrochemical gas sensor. The method can also include using a damping capacitor, such as to connect the at least one pin in the integrated circuit to an electrical ground. The method can also include applying a voltage to the electrochemical gas sensor, such as to provide a bias voltage to at least one electrode in the electrochemical gas sensor. The method can also include receiving a current from at least one electrode in the electrochemical gas sensor. The method can also include determining a measured gas amount from the received current. The method can also include activating a switch located within the integrated circuit, such as to isolate the damping capacitor from the at least one pin in the integrated circuit. The method can also include measuring an impedance of the electrochemical gas sensor, such as using an excitation signal while the at least one damping capacitor can be isolated from the at least one electrode in the electrochemical gas sensor. The method can also include then connecting the damping capacitor to the at least one electrode in the electrochemical gas sensor and further operating the electrochemical gas sensor in a gas detection mode. The method can also include connecting a first pin of an integrated circuit to a working electrode of the electrochemical gas sensor, connecting a second pin of an integrated circuit to a reference electrode of the electrochemical gas sensor, and connecting a third pin of an integrated circuit to a counter electrode of the electrochemical gas sensor. The method can also include using a first damping capacitor to connect the first pin in the integrated circuit to an electrical ground and using a second damping capacitor to connect the second pin in the integrated circuit to an electrical ground. The method can also include activating a first switch located within the integrated circuit, such as to disconnect the first damping capacitor from the first pin of the integrated circuit and activating a second switch located within the integrated circuit, such as to disconnect the second damping capacitor from the second pin of the integrated circuit. The method can also include activating a third switch located within the integrated circuit, such as to deactivate filter circuitry located within the integrated circuit. The method can also include using a third damping capacitor, such as to connect a first biasing amplifier terminal to an electrical ground and using a fourth damping capacitor, such as to connect a second biasing amplifier terminal to an electrical ground. The method can also include activating a third switch located within the integrated circuit, such as to disconnect the third damping capacitor from the first biasing amplifier terminal and activating a fourth switch located within the integrated circuit, such as to disconnect the fourth damping capacitor from the second biasing amplifier terminal. The method can also include measuring an impedance of the electrochemical gas sensor while the first, second, third, and fourth switches can be activated.

In an aspect, the disclosure can feature a method of measuring an impedance of an electrochemical gas sensor. The method can include isolating at least one damping capacitor from at least one electrode in the electrochemical gas sensor. The method can also include measuring an impedance of the electrochemical gas sensor while the at least one damping capacitor can be isolated from the at least one electrode in the electrochemical gas sensor. The method can also include then connecting the damping capacitor to the at least one electrode in the electrochemical gas sensor, such as for operating the electrochemical gas sensor in a gas detection mode. The method can also include disconnecting at least one damping capacitor from bias circuitry, such as that used to provide a bias voltage to at least one electrode in the electrochemical gas sensor and then measuring an impedance of the electrochemical gas sensor while the at least one damping capacitor can be disconnected from the circuitry. The method can also include measuring the impedance of the gas sensor using an excitation signal in a frequency range from 0.2 Hz to 200 kHz while the at least one damping capacitor can be disconnected from the circuitry.

In an aspect, the disclosure can feature a sensor interface circuit for measuring a gas concentration and an impedance of an electrochemical gas sensor. The sensor interface circuit can include an integrated circuit including a first pin configured to be connected to a first electrode in the electrochemical gas sensor. The sensor interface circuit can also include a switch located within the integrated circuit, the switch being configured to connect a noise-suppression capacitor from the first electrode to an electrical ground while the integrated circuit can be in a gas sensing mode and disconnect the noise-suppression capacitor while the integrated circuit can be in an impedance testing mode. The sensor interface circuit can also include bias circuitry configured to provide a bias voltage to an electrode in the electrochemical gas sensor. The integrated circuit can be configured to inject an excitation signal while the noise suppression capacitor can be disconnected. The integrated circuit can include a first pin configured to be connected to a working electrode of the electrochemical gas sensor, a second pin configured to connected to a reference electrode of the electrochemical gas sensor, and a third pin configured to be connected to a counter electrode of the electrochemical gas sensor. The integrated circuit can include a first switch configured to connect a first noise-suppression capacitor from the working electrode to an electrical ground while the integrated circuit can be in a gas sensing mode and a second switch configured to connect a second noise-suppression capacitor from the reference electrode to an electrical ground while the integrated circuit can be in a gas sensing mode. The first switch and the second switch can be configured to be activated at the same time. The first switch and the second switch can be configured to be activated at different times. The integrated circuit can include a third switch configured to deactivate filter circuitry located within the integrated circuit while the integrated circuit can be in an impedance testing mode.

BRIEF DESCRIPTION OF THE DRAWINGS

The present disclosure will now be described, by way of example, with reference to the accompanying drawings, in which.

DETAILED DESCRIPTION OF EMBODIMENTS OF THE DISCLOSURE

In an electrochemical gas sensor, a bias voltage can be maintained between a working electrode and a reference electrode. A noise filter element can reduce the noise of electromagnetic compatibility (EMC) effects, such as radiated immunity disturbances from neighboring radio frequency sources. As the electrochemical gas sensor ages, electrical properties, such as an impedance between the working electrode and the reference electrode can change. The present inventors have recognized, among other things, that it is possible to measure an impedance of the electrochemical gas sensor, such as over a range of excitation frequencies, such as to determine a performance characteristic of the electrochemical gas sensor (e.g., a status of a sensor electrolyte), such as may indicate whether the sensor is still usable, how much usable sensor life remains, a confidence level of the sensor signal, or the like. The present inventors have also recognized, among other things, that it may be advantageous to temporarily isolate the filter element, such as to facilitate diagnostic testing of the electrochemical gas sensor, such as by measuring an impedance of the electrochemical gas sensor, since the noise filter element may attenuate the excitation signal used to measure the sensor impedance.

Figure 1:
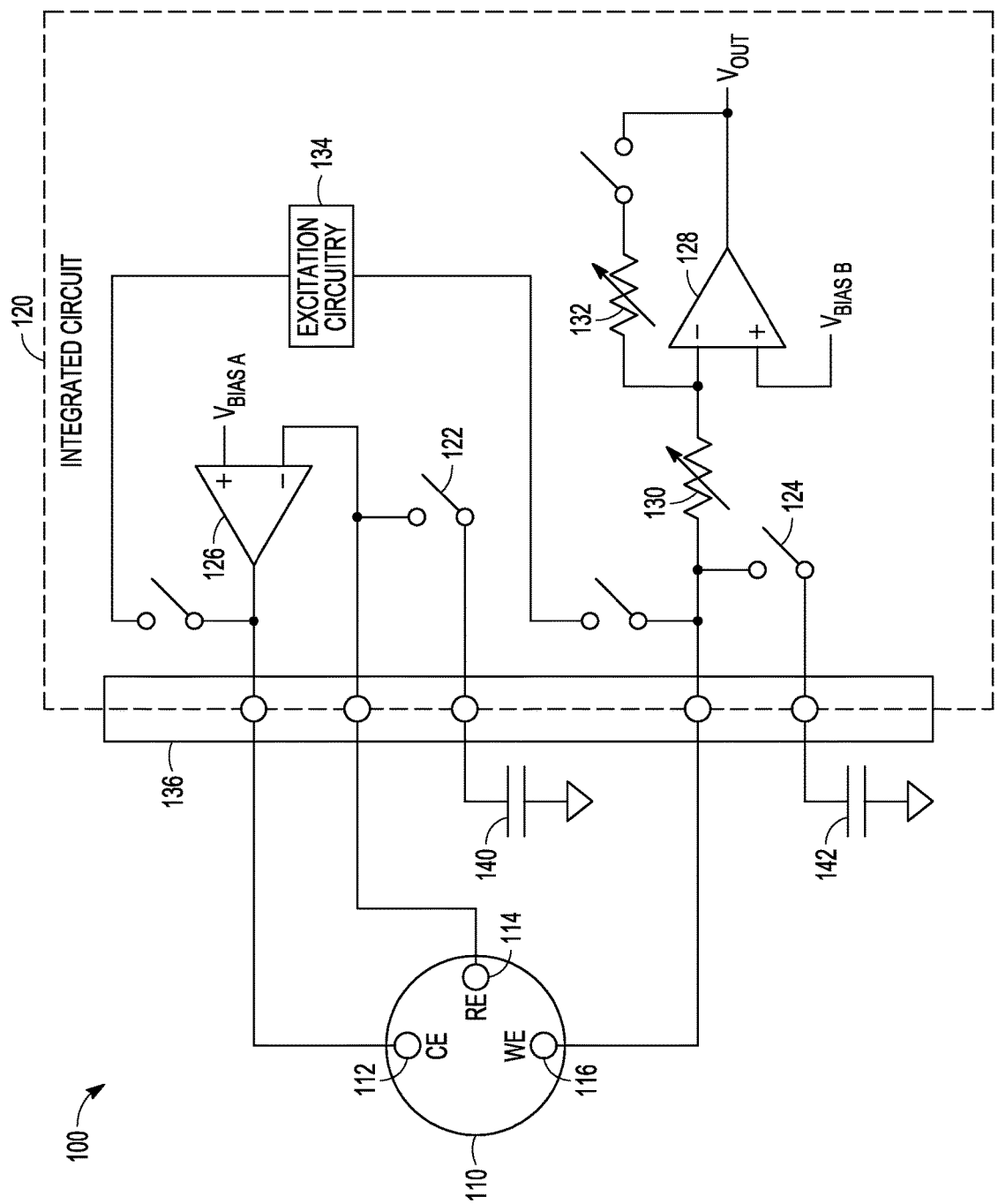
FIG. 1 illustrates a diagram of a gas detection system.

FIG. 1 illustrates a diagram of an example of a gas detection system 100. The gas detection system 100 can include an electrochemical sensor 110, a sensor interface or sensor control integrated circuit 120, and capacitors or like noise filter components 140, 142. The electrochemical sensor 110 can include a counter electrode 112, a reference electrode 114, and a working electrode 116. The sensor interface or sensor control integrated circuit 120 can include programmable or other switches 122 and 124, a biasing amplifier 126, a transimpedance amplifier 128, programmable or other resistors 130 and 132, excitation circuitry 134, and connection pins 136.

Advantageously, the switches 122 and 124, the biasing amplifier 126, the transimpedance amplifier 128, programmable resistors 130 and 132, and the excitation circuitry 134 can be integrated onto a single integrated circuit, such as the sensor interface or sensor control integrated circuit 120, such as to provide a compact design that can save space and provide a minimal footprint. During operation, gas can diffuse through a membrane or can otherwise interact with the working electrode 116. A first bias voltage ($V_{biasA}$) can be applied to the non-inverting terminal of the biasing amplifier 126. The biasing amplifier 126 can adjust an output voltage applied to the counter electrode 112, such as to maintain the reference electrode 114 at the first bias voltage ($V_{biasA}$). A second bias voltage ($V_{biasB}$) can be applied to the non-inverting terminal of the transimpedance amplifier 128. The transimpedance amplifier 128 can adjust an output voltage ($V_{out}$), such as to maintain a voltage at the inverting terminal of the biasing amplifier at the second bias voltage ($V_{biasB}$). A current can flow between the working electrode 116 and the counter electrode 112, where the flow of current can be proportional to a gas concentration in the electrochemical sensor 110. In an example in which an oxidation reaction can take place at the working electrode 116, current can flow into the working electrode 116 from the counter electrode 112. In an example in which a reduction reaction can take place at the working electrode 116, current can flow from the working electrode 116 to the counter electrode 112. The current flowing to or from the working electrode 116 can flow through the resistors 130 and 132, and a voltage ($V_{out}$) at the output of the transimpedance amplifier 128 can provide a voltage signal indicative of the current flowing to or from the working electrode 116, such as to provide an indication of the gas concentration in contact with the electrodes of the electrochemical gas sensor 110. In an example, the first bias voltage ($V_{biasA}$) and the second bias voltage ($V_{biasB}$) can be the same. Free electrons can be generated at the working electrode 116, such as due to small amounts of electrolyte (e.g., water) in the electrochemical sensor 110. Over time, the electrochemical sensor 110 can degrade, such as due to a reduced electrolyte (e.g., water) content, leading to a reduction in the generation of free electrons and change in performance. The excitation circuitry 134 can provide a time-varying excitation voltage between the working electrode 116 and the counter electrode 112, such as to determine change in performance of the electrochemical sensor 110. The change can be reflected as an impedance change, such as a change in impedance between the working electrode 116 and the counter electrode 112. The excitation circuitry 134 can provide an excitation signal having a range of frequencies, such as from about 0.2 Hz to about 200 kHz. The excitation signal can be superimposed or otherwise added to the first bias voltage ($V_{biasA}$). An impedance between the reference electrode 114 and the working electrode 116 can be determined based on a measured response to the excitation signal, for example by measuring a voltage at the output of the transimpedance amplifier 128. The voltage at the output of the transimpedance amplifier 128 can be related by Ohm's law to a specified current known to be flowing to or from the working electrode 116. The impedance measurement over the range of frequencies can provide information about the performance of the electrochemical sensor 110. For example, an electrolyte (e.g., water) content of the electrochemical sensor 110 can be determined from the impedance measurement over the range of frequencies. In an example, the measured impedance values can be compared to stored impedance values to determine an electrolyte content of the electrochemical sensor. In an example, if the determined electrolyte content is below a threshold, an alarm can be sounded and the electrochemical sensor 110 can be replaced.

In an example in which the gas detection system 100 operates in a gas detection mode, a bias voltage between the reference electrode 114 and the working electrode 116 can be fixed and stable. Changes in the bias voltage between the reference electrode 114 and the working electrode 116 can lead to an increased current flowing between the working electrode 116 and the counter electrode 112, such as can cause a false detection of gas. The electrochemical sensor 110 can be susceptible to electromagnetic compatibility (EMC) effects, including due to radiated immunity disturbances from neighboring radio frequency sources. The capacitors, or like noise filter components 140 and 142 can be connected to the reference electrode 114 and the working electrode 116, respectively, such as during a gas-sensing mode of operation to reduce the EMC effects by providing a low impedance path to an electrical ground. Additionally, however, the capacitors or like noise filter components 140 and 142 can interfere with an impedance measurement, such as an impedance measurement over a range of frequencies performed by the excitation circuitry 134. The capacitors or like noise filter components 140 and 142 can interfere with the impedance measurement, such as by providing a low impedance path to an electrical ground for frequencies above 0.2 Hz. In an example, an impedance measurement over a range of frequencies above 0.2 Hz cannot be performed in the presences of the capacitors or like noise filter components 140 and 142. Programmable switches 122 and 124 can be operated to isolate the capacitors or like noise filter components 140 and 142 from the working electrode 112 and the reference electrode 114, respectively, such as during a sensor diagnostic testing mode, such as to facilitate an impedance measurement by the excitation circuitry 134. Additionally, the programmable switches 122 and 124 can be operated to connect the capacitors or like noise filter components 140 and 142 to the working electrode 112 and the reference electrode 114, respectively, such as to reduce EMC effects while the gas detection system 100 is operated in a gas detection mode. In an example, the capacitors or like noise filter components 140 and 142 can include a capacitor having a value of at least 10 nF.

Figure 2A:
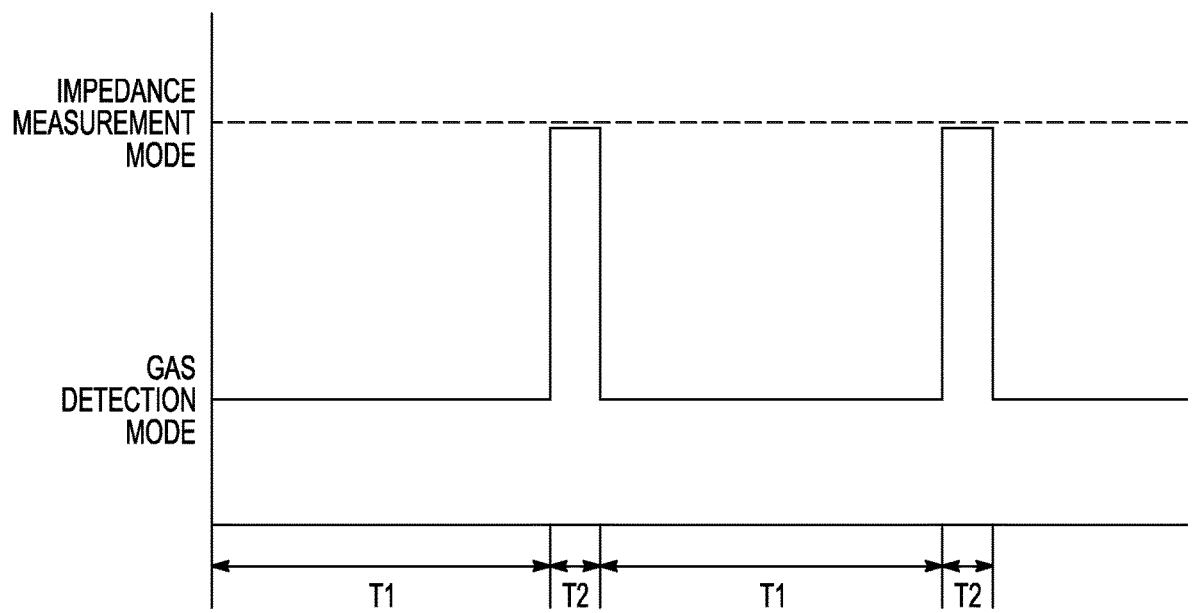
FIGS. 2A and 2B illustrate a method of measuring an impedance in a gas detection system.

FIG. 2A illustrates an example of the operation of a gas detection system, such as gas detection system 100. In the example illustrated in FIG. 2, the gas detection system can operate in a gas detection mode for a first time interval of duration $T_1$. While operating in the gas detection mode, filter capacitors, such as the capacitors or like noise filter components 140 and 142 can be connected to a working electrode and a reference electrode, respectively, of an electrochemical sensor, such as to reduce EMC effects by providing a low impedance path to an electrical ground. The filter capacitors can be connected to the working electrode and the reference electrode by on-chip programmable switches, such as programmable switches 122 and 124. During a second time interval of duration $T_2$, the gas detection system can operate in an impedance measurement mode. While operating in the impedance measurement sensor diagnostic mode, the filter capacitors can be isolated from the working electrode and the reference electrode, such as by activating the on-chip programmable switches to disconnect the filter capacitors from the electrodes. The first time interval can be larger than the second time interval, and can be periodic or aperiodic, recurring or non-recurring. In an example, in which a gas detection system, such as the gas detection system 100 operates in a gas detection mode a majority of the time, the gas detection system can operate in a diagnostic mode approximately once per day, where the first time interval can have a duration of approximately one day and the second time interval can have a duration of approximately one minute. In an example, a duration of the second time interval can be selected to be smaller than a time constant associated with the working electrode or the reference electrode.

Figure 2B:
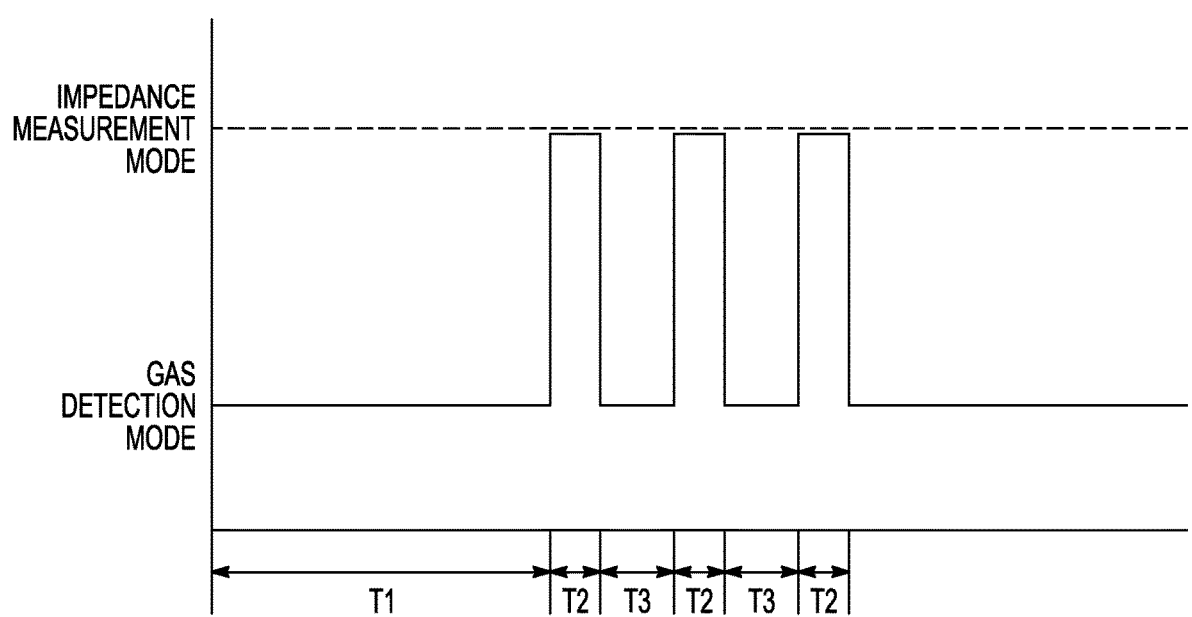

In an example, such as where an impedance measurement can occur over a time interval longer than a time constant associated with the working electrode or the reference electrode, the gas detection system can alternate between a gas detection mode and an impedance measurement mode to provide the impedance measurement. FIG. 2B illustrates an example where the impedance measurement can be performed in three steps. The gas detection system can operate in a gas detection mode for a first time interval having duration $T_1$. During a second time interval, having duration $T_2$, the gas detection system can operate in an impedance measurement mode over a first range of frequencies. During a third time interval, having duration T3, the gas detection system can operate in a gas detection mode. During a fourth time interval, having duration $T_2$, the gas detection system can operate in an impedance measurement mode over a second range of frequencies. During a fifth time interval, having duration T3, the gas detection system can operate in a gas detection mode. During a sixth time interval, having duration $T_2$, the gas detection system can operate in an impedance measurement mode over a third range of frequencies. The impedance measurement over the first, second, and third range of frequencies can be combined to form the impedance measurement over the range of frequencies. In an example, the range of frequencies can be from about 0.2 Hz to about 200 kHz, and the first, second, and third range of frequencies can span approximately equal frequency ranges. In an example, the first time interval can have a duration of approximately one day, and the second, third, fourth, fifth, and sixth time intervals can have a duration of approximately one minute.

Figure 3:
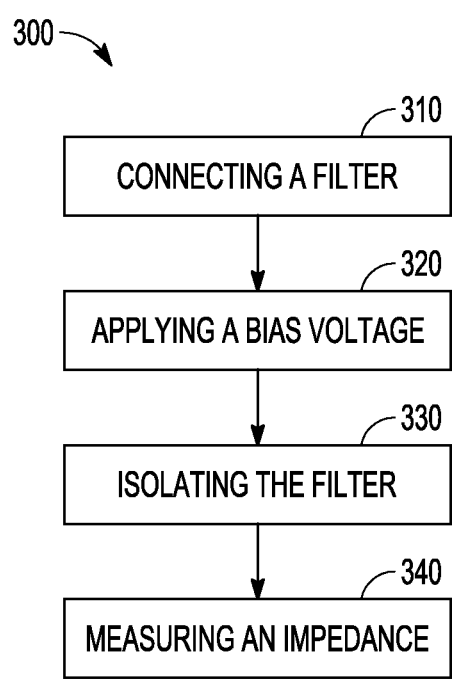
FIG. 3 illustrates a diagram of a method of operating a gas detection system.

FIG. 3 illustrates a method of operating a gas detection system, such as the gas detection system 100. The on-chip programmable switch 122 can provide a connection between filter circuitry, such as the capacitor or like noise filter component 140 and the reference electrode 114, and the on-chip programmable switch 124 can provide a connection between filter circuitry, such as the capacitor or like noise filter component 142 and working electrode 116 (step 310). The biasing amplifier 126 can receive a first bias voltage ($V_{biasA}$) and can adjust an output voltage applied to the counter electrode 112, such as to maintain the reference electrode 114 at the first bias voltage ($V_{biasA}$) and the transimpedance amplifier 128 can receive a second bias voltage ($V_{biasB}$) and can adjust an output voltage, such as to maintain the inverting terminal at the second bias voltage ($V_{biasB}$) (step 320). Prior to carrying out an impedance measurement of the electrochemical sensor 110, the on-chip programmable switch 122 can be activated, such as to disconnect the capacitor or like noise filter component 140 from the reference electrode 114 and the on-chip programmable switch 124 can be activated, such as to disconnect the capacitor or like noise filter component 142 from the working electrode (step 330). The excitation circuitry 134 can provide an excitation signal to the counter electrode 112 and the working electrode 116, and can determine an impedance between the counter electrode 112 and the working electrode 116 based on a measured response to the excitation signal (step 340). After the impedance measurement, the on-chip programmable switch 122 can be activated, such as to connect the capacitor or like noise filter component 140 to the reference electrode 114 and the on-chip programmable switch 124 can be activated, such as to connect the capacitor or like noise filter component 142 to the working electrode 116. The gas detection system 100 can then be operated in the gas detection mode where a voltage sensed at the output of the transimpedance amplifier 128 can provide an indication of the gas concentration in contact with the electrodes of the electrochemical gas sensor 110.

The invention claimed is:

1. A method of measuring an impedance of an electrochemical gas sensor, the method comprising:
   connecting at least one pin in an integrated circuit to at least one electrode in the electrochemical gas sensor;
   using a first damping capacitor to connect the at least one pin in the integrated circuit to an electrical ground;
   applying a constant bias voltage to at least one electrode of the electrochemical gas sensor;
   receiving a current from at least one electrode in the electrochemical gas sensor;
   determining a measured gas amount from the received current;
   activating a first switch located within the integrated circuit to isolate the first damping capacitor from the at least one pin in the integrated circuit;
   while the first switch is activated and while the constant bias voltage is applied, applying a time-varying excitation signal to the at least one electrode of the electrochemical gas sensor; and
   measuring an impedance of the electrochemical gas sensor based at least in part on a response of the electrochemical gas sensor to the constant bias voltage and the time-varying excitation signal.

2. The method of claim 1 further comprising connecting the first damping capacitor to the at least one electrode in the electrochemical gas sensor and further operating the electrochemical gas sensor in a gas detection mode.

3. The method of claim 1 comprising connecting a first pin of an integrated circuit to a working electrode of the electrochemical gas sensor, connecting a second pin of an integrated circuit to a reference electrode of the electrochemical gas sensor, and connecting a third pin of an integrated circuit to a counter electrode of the electrochemical gas sensor.

4. The method of claim 3 comprising using the first damping capacitor to connect the first pin in the integrated circuit to an electrical ground and using a second damping capacitor to connect the second pin in the integrated circuit to an electrical ground.

5. The method of claim 4 comprising activating the first switch located within the integrated circuit to disconnect the first damping capacitor from the first pin of the integrated circuit and activating a second switch located within the integrated circuit to disconnect the second damping capacitor from the second pin of the integrated circuit.

6. The method of claim 5 comprising activating a third switch located within the integrated circuit to deactivate filter circuitry located within the integrated circuit.

7. The method of claim 5 comprising using a third damping capacitor to connect a first biasing amplifier terminal to an electrical ground and using a fourth damping capacitor to connect a second biasing amplifier terminal to an electrical ground.

8. The method of claim 7 comprising activating a third switch located within the integrated circuit to disconnect the third damping capacitor from the first biasing amplifier terminal and activating a fourth switch located within the integrated circuit to disconnect the fourth damping capacitor from the second biasing amplifier terminal.

9. The method of claim 8 comprising measuring the impedance of the electrochemical gas sensor while the first, second, third, and fourth switches are activated.

10. A method of measuring an impedance of an electrochemical gas sensor, the method comprising:
    applying a constant bias voltage to at least one electrode of the electrochemical gas sensor;
    isolating at least one damping capacitor from at least one electrode in the electrochemical gas sensor;
    while the constant bias voltage is applied and while the at least one damping capacitor is isolated, applying a time-varying excitation signal to the at least one electrode of the electrochemical gas sensor; and
    measuring an impedance of the electrochemical gas sensor based at least in part on a response of the electrochemical gas sensor to the constant bias voltage and the time-varying excitation signal.

11. The method of claim 10 further comprising connecting the at least one damping capacitor to the at least one electrode in the electrochemical gas sensor for operating the electrochemical gas sensor in a gas detection mode.

12. The method of claim 11 comprising disconnecting the at least one damping capacitor from bias circuitry used to provide the bias voltage to the at least one electrode in the electrochemical gas sensor and then measuring the impedance of the electrochemical gas sensor while the at least one damping capacitor is disconnected from the bias circuitry.

13. The method of claim 11 further comprising measuring the impedance of the gas sensor using an excitation signal in a frequency range from 0.2 Hz to 200 kHz while the at least one damping capacitor is isolated from the at least one electrode of the electrochemical gas sensor.

14. A method of using an electrochemical gas sensor, comprising:
    applying a constant bias voltage to at least one electrode of the electrochemical gas sensor;
    receiving a current from the at least one electrode in the electrochemical gas sensor while the constant bias voltage is applied;
    determining a measured gas amount from the received current;

isolating at least one damping capacitor from the at least one electrode of the electrochemical gas sensor;

while the constant bias voltage is applied and while the at least one damping capacitor is isolated, applying a time-varying excitation signal to the at least one electrode of the electrochemical gas sensor; and measuring an impedance of the electrochemical gas sensor based at least in part on a response of the electrochemical gas sensor to the constant bias voltage and the time-varying excitation signal.

15. The method of claim 14, wherein the current is received from the at least one electrode of the electrochemical gas sensor before the isolating of the at least one damping capacitor.

16. The method of claim 14 comprising connecting a first pin of an integrated circuit to a working electrode of the electrochemical gas sensor, connecting a second pin of an integrated circuit to a reference electrode of the electrochemical gas sensor, and connecting a third pin of an integrated circuit to a counter electrode of the electrochemical gas sensor.

17. The method of claim 16 comprising using a first damping capacitor to connect the first pin in the integrated circuit to an electrical ground and using a second damping capacitor to connect the second pin in the integrated circuit to an electrical ground.

18. The method of claim 17 comprising activating a first switch located within the integrated circuit to disconnect the first damping capacitor from the first pin of the integrated circuit and activating a second switch located within the integrated circuit to disconnect the second damping capacitor from the second pin of the integrated circuit.

19. The method of claim 14 comprising disconnecting the at least one damping capacitor from bias circuitry used to provide the constant bias voltage to the at least one electrode in the electrochemical gas sensor and then measuring the impedance of the electrochemical gas sensor while the at least one damping capacitor is disconnected from the bias circuitry.

20. The method of claim 14 further comprising measuring the impedance of the gas sensor using an excitation signal in a frequency range from 0.2 Hz to 200 kHz while the at least one damping capacitor is isolated from the at least one electrode of the electrochemical gas sensor.

* * * * *